July 9, 1940.  T. ZUSCHLAG  2,207,392
DEMAGNETIZATION
Filed April 7, 1939
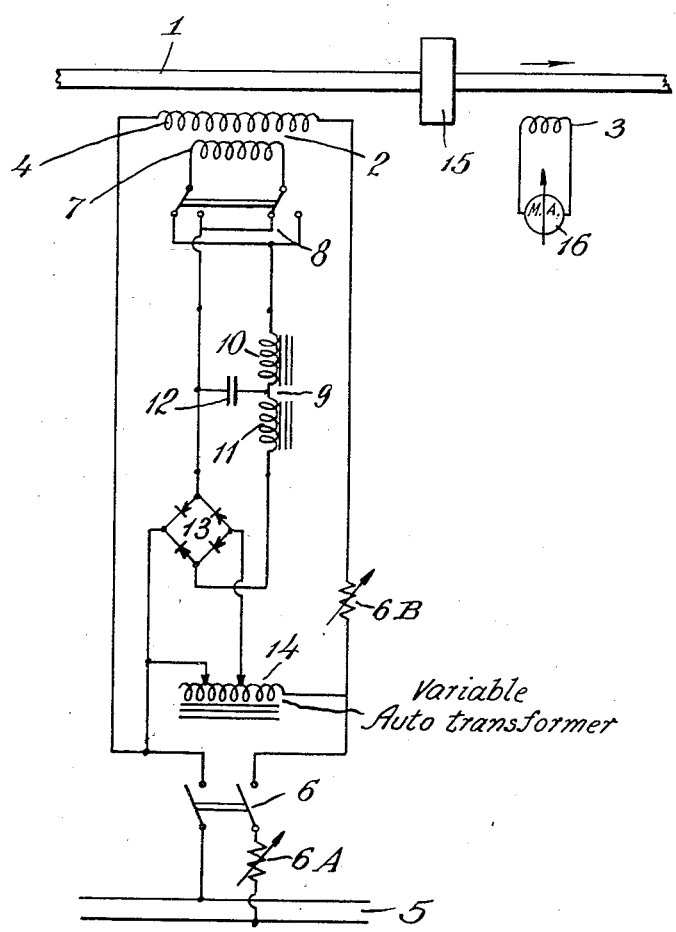
INVENTOR
Theodor Zuschlag
BY
Pennie, Davis, Marvin and Edmonds
ATTORNEYS Patented July 9, 1940

2,207,392

UNITED STATES PATENT OFFICE 2,207,392

DEMAGNETIZATION

Theodor Zuschlag, West Englewood, N. J., assignor to Magnetic Analysis Corporation, Long Island City, N. Y., a corporation of New York Application April 7, 1939, Serial No. 266,488

15 Claims. (Cl. 175—181)

This invention relates to the demagnetization of magnetic bodies, and is concerned particularly with the removal of magnetism retained in steel and the like as the result of the exposure thereof to magnetic influences.

All steel products are susceptible to magnetization which, in many cases, interferes with their use. This is particularly true of elongated steel articles such as rods, bars and tubes, and it has been proposed heretofore to demagnetize these and other steel shapes by means of an alternating electromagnetic field. It has been assumed, and it is in general true, that such treatment will bring about demagnetization, provided that the alternating electromagnetic field in which the steel is disposed is sufficiently strong. I have observed, however, that in many instances complete demagnetization is not obtained even with a very strong alternating field, and that under some circumstances exposure of steel to the inductive effects of such a field is accompanied by an increase in magnetization.

It has become common to subject steel products to magnetic testing to determine their physical and metallurgical characteristics, such, for example, as the existence of strains or flaws, and in the course of such testing the products are passed through a strong alternating electromagnetic field. Under such circumstances, I have observed, the products sometimes become magnetized. In certain localities the tendency for such magnetization to occur is pronounced, due, I believe, to the fact that in such localities the strength or distribution of the earth magnetic field or other unidirectional magnetic forces continue to act upon the molecules of the magnetic body and tend to align them despite the action of the alternating field. In fact, the action of the alternating field upon the molecules appears in some instances to facilitate magnetization by magnetizing influences, which otherwise do not bring about detectable magnetization of the product.

Demagnetization of a steel bar or the like may sometimes be brought about by passing it through a coil energized by alternating current and disposed normal or perpendicular to the magnetic meridian. In commercial practice, however, this condition cannot be obtained always. Thus, in steel mills and warehouses, the layout may be such that the coil has to be disposed at variance with the magnetic meridian, or the local earth magnetic field may be so distorted by natural or artificial magnetic forces as to make it impossible to assign a definite direction for the magnetic meridian within the length of the steel specimen. Under such conditions, complete demagnetization of a steel specimen is seldom attained merely by passing it through a strong A. C. (alternating current) field. Attainment of a complete demagnetization by these means under such conditions is primarily a matter of chance, and the odds are in favor of increasing magnetization while attempting to decrease it.

As indicated hereinbefore, the failure to demagnetize and the actual increase in magnetization sometimes occasioned by treatment of a specimen in an A. C. field may result because the elementary magnetic particles in the specimen orient themselves more readily in the direction of the earth magnetic field or any other extraneous unidirectional field while under the influence of the A. C. field. In any event, I have found that by employing an auxiliary direct electromagnetic field superimposed upon a relatively strong alternating electromagnetic field and equal in intensity but opposite in sign to the extraneous magnetic influences operating upon a body in a given locality, I can bring about complete demagnetization of the body. My invention thus contemplates a method for demagnetizing a magnetic body which comprises subjecting the body to the simultaneous action of a relatively intense alternating-current electromagnetic field and a direct-current field which is equal in intensity but opposite in sign to the summation of extraneous magnetizing forces operating upon the body. It is unnecessary, however, to make a separate determination of the sign and intensity of such extraneous forces or their summation, provided that means are provided for varying the sign and intensity of the direct current field, for in such case the sign or intensity or both of the field may be varied until a magnetism detecting device inductively associated with the body indicates that it is completely demagnetized. To this end my invention contemplates means for creating an alternating electromagnetic field in inductive association with a magnetizable body, means for superimposing on the alternating field a direct electromagnetic field, means for varying the sign (i..e. reversing the direction) and the intensity of the direct field and the intensity of the alternating field, and a magnetism detecting device inductively associated with the body for determining when the sign and intensity of the direct field are such as to neutralize extraneous magnetizing forces as indicated by an absence of magnetism in the body.

These and other features of my invention will be apparent in the light of the following detailed description of a presently preferred practice of my invention, taken in conjunction with the accompanying single figure, which is a schematic diagram of one form of the apparatus of my invention.

Referring now to the diagram, it will be seen that a magnetic specimen 1, for example, a bar of cold-rolled steel, is passed to the right in the direction of the arrow through an "activator" coil assembly 2 and then through a "detector" coil 3.

The activator coil assembly comprises an energizing coil 4 composed of a series of turns of wire of low ohmic resistance and of sufficient diameter to permit the specimen to be passed therethrough. The energizing coil is connected across an alternating current source, such as an A. C. supply line 5 (which conveniently is an ordinary commercial lighting circuit having a frequency of 60 cycles per second and a potential of 110 volts) through a cut-off switch 6. For convenience of adjusting the potential applied to the energizing coil, a variable reactance or resistance 6A may be connected in the circuit between the cut-off switch and the A. C. supply line and another variable resistance or reactance 6B may be connected in the circuit between the switch and the energizing coil 4.

The activator coil assembly also contains a neutralizing coil 7 which is disposed adjacent to the energizing coil so as to be in inductive relationship therewith and superimpose its direct electromagnetic field on the alternating electromagnetic field of the energizing coil. This is accomplished by disposing the two coils in a parallel and preferably in a concentric position, with the turns of the neutralizing coil wound around or within the energizing coil. Like the energizing coil, the neutralizing coil should be made of low ohmic resistance wire or the like.

The ends of the neutralizing coil are connected respectively to the arms of a reversing switch 8, the contact points of which are connected to the output side of a filter network 9. The filter network may consist of a pair of iron core chokes 10, 11, connected together in series and connected at their common point by a condenser 12 shunted across the circuit. The input side of the filter network is connected to the output side of a full-wave rectifier 13 preferably of the copper oxide type, the input leads of which are connected respectively to the output leads of a transformer 14 which is so constructed that its ratio may be varied over a wide range, thus permitting control of its output voltage from a relatively high figure down substantially to zero. There are several types of variable-ratio transformers which will serve, but I prefer to employ a so-called "Variac" transformer made by the General Radio Company. The input leads of the transformer are connected across the A. C. circuit between the cut-off switch and the energizing coil.

Viewed in another light, the circuit which supplies the direct current to the neutralizing coil comprises the "Variac" transformer for regulating the voltage, followed by the rectifier for rendering the current unidirectional, the filter for suppressing undesirable A. C. components and harmonics, and the reversing switch to permit the direction of current through the neutralizing coil to be changed and thus alter the sign of the resulting direct electromagnetic field.

Disposed around the line of passage of the specimen through the apparatus between the activator coil assembly and the detector coil 3 is a short-circuit ring 15 which may be a massive metal annulus disposed at right angles to the bar and concentric but out of contact therewith.

The apparatus is completed by a microammeter 16 connected in series with the detector coil 3 for purposes of detecting current induced in the coil by residual magnetism in the specimen. This meter should preferably have a zero-center scale. In place of the microammeter, other magnetism indicating devices, such as a ballistic galvanometer or a flux meter, may be used.

The operation of the apparatus is as follows: The cut-off switch 6 is thrown to the "off" position, and a specimen to be demagnetized (for example, a steel bar) is passed through the coils of the activator assembly and the test coil. If the bar is magnetized, the microammeter will show a pronounced deflection.

Next, with the bar disposed in the coils of the activator assembly and in the detector coil, and with the "Variac" transformer set at its zero position so that the neutralizing coil will remain substantially unenergized, the cut-off switch is closed so as to energize the A. C. coil 4, and the deflection of the microammeter is again observed. Depending upon the distribution, strength and distortion of the local earth magnetic field or other extraneous magnetic fields, the magnetization of the bar (as indicated by the deflection of the microammeter) may be reduced or increased.

The deflection of the microammeter now is reduced to zero by suitable adjustment of the reversing switch and the slider of the "Variac" transformer. Such adjustment produces in the neutralizing coil a direct current flow having a direction and potential such that a unidirectional electromagnetic field is created that is equal in intensity but opposite in sign to that created in the neighborhood of the bar by extraneous magnetic forces including earth magnetism. This field, acting in conjunction with the A. C. field, reduces the residual magnetism in the specimen to a very low value.

In practice, demagnetization of specimens is best carried on in three stages, in all of which the specimen is moved slowly through the coils at a speed of say 100 feet per minute, while the microammeter is observed and the various adjustments are made. In the first stage, as indicated hereinbefore, neither the energizing coil nor the neutralizing coil is energized, and in the event that no deflection is observed at the microammeter, the specimen is found to be demagnetized and nothing further need be done. If, however, there is a deflection at the microammeter the specimen is again passed through the apparatus with only the A. C. coil 4 energized. The direction of deflection of the microammeter at this second stage of the operation will furnish a guide as to the direction in which the reversing switch should be thrown in the third stage, when the specimen is again passed through the apparatus with power supplied to both the energizing and the neutralizing coils, and the settings of the slider of the "Variac" transformer and of the reversing switch are adjusted until the microammeter reads zero.

The short-circuit ring is inserted between the activator assembly and the detector coil as a shield to reduce the effect of the fields set up by the activator assembly upon the microammeter. This permits the magnetism detector to be disposed adjacent the demagnetizing apparatus and leads to convenience in operation. However, the detector may be disposed at a distance from the demagnetizing apparatus and therefore out of inductive relationship therewith, in which case the specimens must be conveyed thereto between testing stages. Likewise, the short-circuit ring may be omitted if current is cut off the coils of the activator assembly whenever a reading is taken on the microammeter.

The apparatus and method described herein is intended primarily for the treatment of elongated bodies. It may, however, be used for the treatment of any shape of magnetized body which can be disposed within the fields of the coils of the activator assembly. Thus, rings, billets, plates, etc., may be tested. In such case, it is often desirable to leave the body being demagnetized in a stationary position in the activator assembly during each of the stages of procedure, obtaining the effect of passing the body through the coil assembly by gradually and substantially reducing the energy supplied to the apparatus by increasing the variable resistance or reactance 6A.

The apparatus and method of my invention, and particularly the modifications thereof described herein, are useful in demagnetizing bodies in any locality, but offer outstanding advantages in localities where prior proposals for demagnetization have not achieved outstanding success.

I claim:

1. A method of demagnetizing a magnetic object which comprises moving the object slowly through a strong alternating magnetic field upon which is superimposed a direct magnetic field and into inductive relationship with a magnetism detecting device and regulating the sign and intensity of the direct magnetic field until the device indicates that the object is non-magnetic.

2. A method of demagnetizing a magnetic object which comprises disposing the object in the field of a relatively strong alternating potential upon which is superimposed a direct magnetic field that is substantially equal in intensity but opposite in sign to all other direct magnetic forces in the vicinity of said fields, and gradually reducing the intensity of both fields substantially.

3. A method of demagnetizing a magnetic object which comprises simultaneously subjecting the object to a relatively strong alternating electromagnetic field and a relatively weak direct electromagnetic field and adjusting the sign and intensity of said direct field until it is equal and opposite to all other direct electromagnetic forces operating upon said object.

4. A method for demagnetizing a magnetic body which comprises moving the body slowly through a relatively strong alternating electromagnetic field upon which is superimposed a relatively weak direct electromagnetic field of opposite sign to all other direct magnetic forces operating upon the body while determining the magnetism retained in the body and varying the intensity of the direct field while the object is disposed therein until the body retains substantially no magnetism.

5. A method for demagnetizing a magnetic body which comprises disposing the body in a relatively strong alternating electromagnetic field upon which is superimposed a direct electromagnetic field of opposite sign to all other direct magnetic forces operating upon the body, determining the magnetism retained in the body thus located, and varying the intensity of the direct electromagnetic field until substantially no magnetism is retained in the body.

6. A method for demagnetizing a magnetic body which comprises disposing the body in a relatively strong alternating electromagnetic field upon which is superimposed a substantially parallel direct electromagnetic field of sign opposite to that of the summation of all other direct magnetic forces operating upon the body, and varying the intensity of the direct electromagnetic field until substantially no magnetism is retained in the body.

7. A method for demagnetizing a magnetic body which comprises disposing the body in a relatively strong alternating electromagnetic field upon which is superimposed a substantially parallel direct electromagnetic field, determining the magnetism retained in the body thus treated, varying the sign of the direct electromagnetic field until the body retains minimum magnetism, and thereafter varying the intensity of the direct field while maintaining its sign constant until substantially no magnetism is determined in the body.

8. In apparatus for demagnetizing a magnetic body the combination which comprises means for producing a relatively strong electromagnetic field in said body, means for simultaneously producing a direct electromagnetic field in said body, means for determining magnetism retained in said body, means for varying the intensity of the direct field and means for varying the sign of the direct field.

9. In apparatus for demagnetizing a magnetic body the combination which comprises a first coil energized by alternating current and adapted to be disposed in inductive relationship with the body, a second coil disposed adjacent and substantially parallel to the first coil and energized by direct current, means for changing the direction of direct current flow through the second coil, means for varying the potential of the direct current flowing through the second coil, and means for determining magnetism retained in the body.

10. In apparatus for demagnetizing a magnetic body the combination which comprises a first coil disposable in inductive relationship with the body and energized by alternating current, a second coil disposed adjacent the first coil substantially coaxial therewith and energized by direct current, a magnetism detector disposable in inductive relationship with the body but substantially out of inductive relationship with the coils while the body itself is in inductive relationship with the coils, means for varying the direction of direct current flow through the second coil, and means for varying the potential of the direct current flowing through the second coil.

11. In apparatus for demagnetizing a magnetic body the combination which comprises a first coil energized by alternating current and adapted to be disposed in inductive relationship with the body, a second coil disposed adjacent and substantially parallel to the first coil and energized by direct current, a magnetism detector disposable in inductive relationship with the body, a short circuit ring located around the body between the coils and the detector, means for changing the direction of direct current flow through the second coil, and means for changing the potential of the direct current flowing in the second coil.

12. In apparatus for demagnetizing a magnetic body the combination which comprises a first coil connected to a source of alternating current and disposable in inductive relationship with the body, a second coil disposed adjacent the first coil and connected by a second circuit to the current source through a rectifier, means for changing the potential of the direct current flowing in the second circuit, means for changing the direction of the direct current flow in the second circuit, and a magnetism detector disposable in inductive relationship with the body but uninfluenced by electromagnetic fields produced in said coils.

13. In apparatus for demagnetizing a magnetic body, the combination which comprises a first coil connected to a source of alternating current in a first circuit and disposable in inductive relationship with the body, means for changing the potential of alternating current supplied to the first coil, a second coil disposed adjacent the first coil in inductive relationship with the body, a second circuit connected to the first coil and to the source of alternating current, a rectifier connected in the second circuit, means for changing the potential of the current in the second circuit, means connected in the second circuit for changing the direction of flow of rectified current through the second coil, and means for determining magnetism retained in said body.

14. In apparatus for demagnetizing a magnetic body the combination which comprises a first coil connected to a source of alternating current, by a first circuit and disposable in inductive relationship with the body, a second coil disposed adjacent the first coil in inductive relationship with the body, a transformer having a variable output connected on its input side to the source of alternating current and on its output side to a second circuit connected to the second coil, a rectifier in the second circuit, means for varying the direction of flow of rectified current through the second coil, and means for determining magnetism retained in the body.

15. In apparatus for demagnetizing a magnetic body the combination which comprises a first coil connected to a source of alternating current through a first circuit and disposable in inductive relationship with the body, a second coil disposable in inductive relationship with the body adjacent the first coil, a second circuit connected to the second coil and to the source of alternating current through a transformer, means for varying the output of the transformer, a rectifier disposed in the second circuit between the transformer and the second coil, a reversing switch disposed in the second circuit, and means for determining magnetism retained in the body.

THEODOR ZUSCHLAG.